(No Model.)
O. C. MACKLETT.
FISH SCRAPER.
No. 565,999. Patented Aug. 18, 1896.
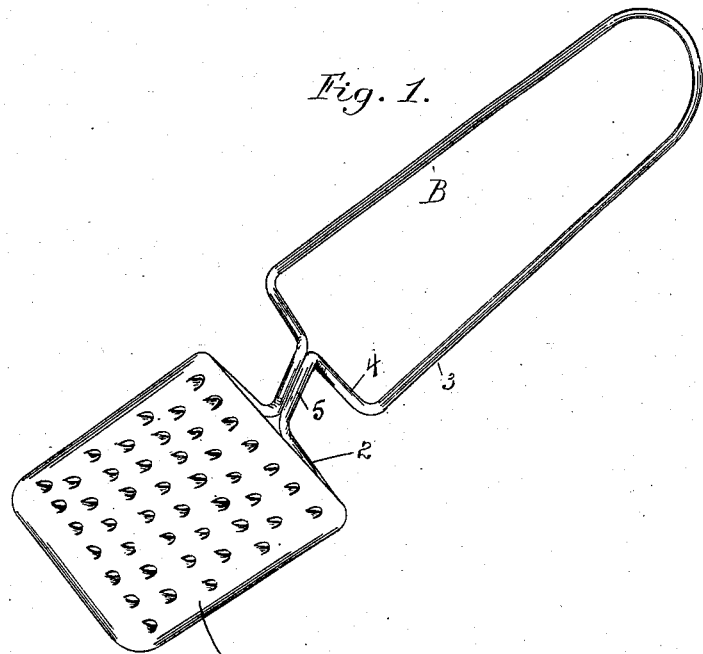
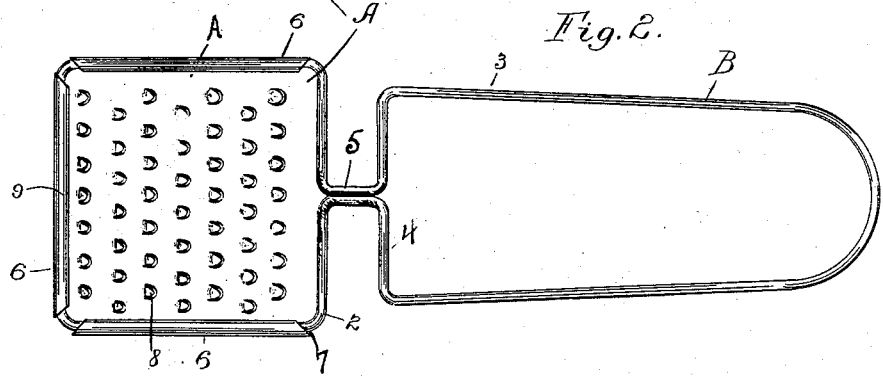
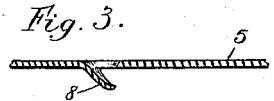
Witnesses:
Inventor:
Otto C. Macklett

UNITED STATES PATENT OFFICE.

OTTO C. MACKLETT, OF ST. PAUL, MINNESOTA.

FISH-SCRAPER.

SPECIFICATION forming part of Letters Patent No. 565,999, dated August 18, 1896.

Application filed December 31, 1895. Serial No. 573,986. (No model.)

*To all whom it may concern:*

Be it known that I, OTTO C. MACKLETT, residing at 557 Canada street, in the city of St. Paul, in the county of Ramsey and State of Minnesota, have invented certain new and useful Improvements in Fish-Scrapers, for the purpose of removing the scales from fish; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to instruments for scaling fish, and has for its object the provision of a device which shall be simple and inexpensive to make and easily manipulated.

In the accompanying drawings, forming part of this specification, Figure 1 is a perspective view of my device. Fig. 2 is a top plan view. Fig. 3 is a longitudinal sectional view through one of the teeth, and Fig. 4 is a top view of the same.

The device consists of the handle portion B and the scaling plate or scraper A. The scraper is preferably made of tin, cut to the desired shape, and having the teeth cut from the body thereof by any suitable die, the ends of the teeth being pressed below the plane of the plate and slightly concaved or cup-shaped, as shown in Figs. 3 and 4.

Upon three sides the scraper is folded and turned back upon itself to engage the handle B, as hereinafter set forth. The handle is formed of a single piece of wire bent back upon itself at the base of the handle proper to form the parallel sides 3, thence inwardly, as at 4, and thence again parallel to form a rigid connection 5 between the handle proper and the parts to which the scraper is secured. The wires at the base of the connection 5 are carried outwardly a sufficient distance, and thence bent at 2 to form the parallel pieces 7 7, which are inclosed by the folds 6 in the sides of the scraper, the wires being again turned toward each other, and brought together at 9 within the fold 6 in the top of the scraper.

I claim as my invention—

A fish-scraper comprising a flat metal plate having suitable cup-shaped teeth integrally formed therewith and the folds upon its sides and top, and a handle formed of a single piece of wire having the rigid connecting portion 4 the sides 7 and ends thereof being confined within the folds in the sides and top of the plate, as and for the purpose set forth.

In testimony whereof I affix my signature in presence of two witnesses.

OTTO C. MACKLETT.

Witnesses:
A. R. KIEFER,
F. O. HAMMER.